(12) United States Patent
Nakatani et al.

(10) Patent No.: US 6,722,464 B2
(45) Date of Patent: Apr. 20, 2004

(54) WORKING VEHICLE

(75) Inventors: Yasunobu Nakatani, Sakai (JP); Kenji Kato, Sakai (JP); Isamu Morimoto, Tondabayashi (JP); Atsushi Shinkai, Ssakai (JP); Keishiro Nishi, Sakai (JP)

(73) Assignee: Kubota Corporation, Osaka (JP)

( * ) Notice: Subject to any disclaimer, the term of this patent is extended or adjusted under 35 U.S.C. 154(b) by 177 days.

(21) Appl. No.: 09/940,251

(22) Filed: Aug. 27, 2001

(65) Prior Publication Data

US 2002/0139600 A1 Oct. 3, 2002

(30) Foreign Application Priority Data

Mar. 29, 2001 (JP) ........................ 2001-096048
Mar. 29, 2001 (JP) ........................ 2001-096049

(51) Int. Cl.$^7$ ............................................. B60K 17/10
(52) U.S. Cl. ................... 180/305; 180/307; 180/53.62
(58) Field of Search ................ 180/305, 307, 180/291, 292, 337, 364, 53.1, 53.62; 74/15.63, 481, 560

(56) References Cited

U.S. PATENT DOCUMENTS

| 2,140,687 | A | * | 12/1938 | Brown | 74/15.63 |
|---|---|---|---|---|---|
| 3,196,696 | A | * | 7/1965 | Ritter | 74/15.63 |
| 3,448,635 | A | * | 6/1969 | Nelson | 475/160 |
| 3,511,105 | A | * | 5/1970 | Matter | 74/481 |
| 3,898,891 | A | * | 8/1975 | Colloton | 74/473.1 |
| 4,040,306 | A | * | 8/1977 | Jensen | 74/334 |
| 4,145,883 | A | * | 3/1979 | Forster | 60/458 |
| 4,262,768 | A | * | 4/1981 | Itatani et al. | 180/242 |
| 4,341,129 | A | * | 7/1982 | Bando | 74/481 |
| 4,402,181 | A | * | 9/1983 | Acker et al. | 60/427 |
| 4,528,867 | A | * | 7/1985 | Semba et al. | 74/606 R |
| 4,977,760 | A | * | 12/1990 | Ishimori et al. | 60/444 |
| 5,233,880 | A | * | 8/1993 | Sato et al. | 74/473.16 |
| 5,526,892 | A | * | 6/1996 | Matsuda | 180/53.1 |
| 5,542,307 | A | * | 8/1996 | Hasegawa et al. | 74/15.63 |
| 5,544,547 | A | | 8/1996 | Ishimaru | |
| 5,570,605 | A | | 11/1996 | Kitagawara et al. | |
| 6,250,414 | B1 | * | 6/2001 | Sato et al. | 180/307 |

FOREIGN PATENT DOCUMENTS

| GB | 1 605 068 | 12/1981 |
|---|---|---|
| JP | 5018458 | 1/1993 |
| JP | 11091380 | 4/1999 |

\* cited by examiner

*Primary Examiner*—Brian L. Johnson
*Assistant Examiner*—J. Allen Shriver

(57) ABSTRACT

A frameless type working vehicle includes an intermediate vehicle body 5 acting as a body forming member for interconnecting a front vehicle body 3 and a rear vehicle body 4. The intermediate vehicle body is formed of a case block 10 housing a hydrostatic stepless transmission (HST) 20. The case block 10 includes, formed integral with one another, a small diameter portion 11 connected to the rear vehicle body 4 and providing case walls for a pump P and a motor M of HST 20, a large diameter portion 12 connected to the front vehicle body 3 and having an upper edge at a higher level than an upper surface of the small diameter portion 11, and a transitional portion 12A disposed between the small diameter portion 11 and the large diameter portion 12. The large diameter portion 12 defines an accommodating space S1 for a main clutch 9 that receives drive from an engine E.

9 Claims, 12 Drawing Sheets

WORKING VEHICLE

BACKGROUND OF THE INVENTION

1. Technical Field of the Invention

This invention relates to working vehicles such as agricultural vehicles and light civil engineering vehicles. More particularly, the invention relates to a working vehicle of the frameless type that uses a case block of a hydrostatic stepless transmission hereinafter abbreviated as HST) as a body forming member for connecting a front vehicle body and a rear vehicle body.

2. Description of the Related Art

A working vehicle of the frameless type (e.g. a frameless type tractor) as noted above may have a reduced number of components and a reduced number of steps for assembling the components to long frames extending between the front vehicle body and rear vehicle body, compared with a frame type tractor carrying an engine and an HST. Thus, the frameless type working vehicle is attracting attention as a working vehicle having advantages distinct from the tractor of the type having body frames.

A conventional frameless type tractor has a body structure as disclosed in Japanese patent laying-open publication H11-91380 (or U.S. Pat. No. 6,250,414 which has a priority claim from the Japanese application), for example. This known vehicle body structure includes a front body having an engine, and a rear body having a transmission case. Connected in series between the front body and rear body are a clutch housing containing a main clutch for connecting and disconnecting engine drive, and a case block acting as an HST.

In the above conventional structure, however, the case block acting as an HST is connected to the front and rear vehicle bodies through a relatively large number of connecting positions and relatively small connecting areas. Consequently, the conventional structure has a drawback in strength, and a drawback in manufacture, i.e. difficulty to attain assembling accuracy.

SUMMARY OF THE INVENTION

The object of this invention is to secure a necessary strength and precision in assembly, and to facilitate an operation to connect a front vehicle body and a rear vehicle body by effectively utilizing an HST case block acting as an intermediate vehicle body interconnecting the front and rear vehicle bodies.

The above object is fulfilled, according to this invention, by a working vehicle comprising:

an engine;

a main clutch for connecting and disconnecting drive from the engine;

a hydrostatic stepless transmission with a pump and a motor for changing speed of the drive transmitted from the main clutch;

a front vehicle body supporting the engine;

a rear vehicle body comprising a transmission case housing a propelling transmission for receiving speed-changed drive from the hydrostatic stepless transmission; and an intermediate vehicle body connected to the front vehicle body and the rear vehicle body to constitute a body of the working vehicle in combination with the front vehicle body and the rear vehicle body;

wherein the intermediate vehicle body comprises a case block housing the hydrostatic stepless transmission;

the case block includes, formed integral with one another, a small diameter portion connected to the rear vehicle body and providing case walls for the pump and the motor, a large diameter portion connected to the front vehicle body and having an upper edge at a higher level than an upper surface of the small diameter portion, and a transitional portion disposed between the small diameter portion and the large diameter portion; and the large diameter portion defines an accommodating space for the main clutch.

With the above construction, the case block of the HST includes the large diameter portion formed integral with the small diameter portion and transitional portion, and having an upper edge higher than the upper surface of a change speed block portion providing case walls for the pump and motor. Consequently, the case block has an enlarged area for connection to the front vehicle body, to realize an improved connecting strength.

Since the case block has, as an integral part thereof, the large diameter portion having an accommodating space of the main clutch, one connecting position is omitted from the construction in that there is no need for connection to a clutch housing. In this sense also, connecting strength may be improved.

The vehicle body structure according to this invention is advantageous in that the above aspects produce a multiplier effect to improve connecting strength and reduce the number of connecting steps.

Where the case block is connected to the front vehicle body, the main clutch is linked not through a rotary shaft acting as an input to the pump of the HST, but through a transmission shaft interlocked to a transmission gear on the rotary shaft. That is, the main clutch fixed to the front vehicle body different from the case block is connected, through a gear transmission mechanism, using the main clutch transmission shaft which provides some flexibility for accuracy, rather than the input shaft of the pump which requires assembling accuracy. Thus, where the case block is connected to the front vehicle body, a connection is not made that would require a very high degree of accuracy such as fitting the pump input shaft adjacent a bearing fixed to the case. Instead, drive transmission is made through a connection between the transmission shaft and a component of the main clutch, which allows a relatively good assembling adaptability.

Thus, the vehicle body structure according to this invention is advantageous in reducing the required assembling accuracy to some extent, and realizing a simplified assembling process.

The transitional portion may have an upper surface in form of an inclined wall so that the case block has a sectional profile gradually changing from the small diameter portion to the large diameter portion. This construction provides an advantage of forming a smooth transition from the small diameter portion to the large diameter portion without impairing the case strength.

On the other hand, the small diameter portion, the large diameter portion and the transitional portion may have respective lower surfaces at an equal level. This assures simplicity of an assembling process, and necessary strength. Moreover, a sufficient ground height may readily be secured for the vehicle to run smoothly despite ruggedness of the ground.

In the working vehicle according to this invention, a shaft supporting wall portion is provided in a case interior including the inclined wall, for supporting a main clutch transmission shaft for outputting engine drive from the main clutch, and a pump rotary shaft provided for the pump as an input shaft of the hydrostatic stepless transmission for receiving the engine drive.

Generally, the inclined wall where the sectional profile of the case gradually changes from the small diameter portion to the large diameter portion tends to have reduced strength. However, according to this invention, the shaft supporting wall portion formed in the case interior reinforces the case interior including the inclined wall. Not only is the above inconvenience in strength avoided, but also the strength of the case block itself may be improved by the shaft supporting wall portion.

In the working vehicle according to this invention, the shaft supporting wall portion includes:
 a first partition having bearings for supporting forward ends of the pump rotary shaft and a motor rotary shaft provided for the motor as an output shaft of the hydrostatic stepless transmission;
 a second partition having a bearing for supporting a rearward end of a transmission gear mounted on an end of the pump rotary shaft extending through the first partition, and a bearing for supporting a rearward end of a transmission gear formed on a rear end region of the main clutch transmission shaft; and
 a third partition having bearings for supporting forward regions of the transmission gears, and dividing an arranging space of the transmission gears from the accommodating space of the main clutch;
 the third partition having a lid member detachably attached to the second partition.

By employing the above construction, the shaft supporting wall portion may be formed of a combination of the first, second and third partitions, instead of a single partition. This reinforces an increased area where the sectional profile of the case block changes, to minimize low strength parts. By reinforcing an increased area where the sectional profile of the case block changes, the strength of the case block may be further increased.

A different feature of this invention resides in that the arranging space of the transmission gears communicates, for allowing a circulation of pressure oil, with a change speed chamber space formed in the small diameter portion for housing the pump and the motor of the main propelling change speed device.

By employing the above construction, pressure oil is allowed to circulate between the gear arranging space defined by the shaft supporting wall portion of the case block and the change speed chamber space housing the pump and the motor of the HST. This dispenses with oil piping from the HST to the gear arranging space, and oil piping from the gear arranging space to the change speed chamber space. Thus, lubricating oil passages may be provided without requiring a complicated piping structure. Further, a space capacity is enlarged by substantially integrating the gear arranging space to the change speed chamber space. This easily avoids such an inconvenience as a sharp increase in the temperature of lubricating oil which could occur in a small gear arranging space not communicating with the change speed chamber space.

A further feature of this invention resides in that the pump rotary shaft has an axis located below and offset to one side transversely of the vehicle body from an axis of the main clutch transmission shaft, and the motor rotary shaft has an axis located below and offset to the other side transversely of the vehicle body from the axis of the pump rotary shaft.

By employing the above construction, compared with a construction where the axis of the pump rotary shaft is located directly under the axis of the main clutch transmission shaft, the two axes may be vertically spaced from each other by a reduced distance, slightly reduced as it may be. In addition, the axis of the pump rotary shaft may be offset transversely of the vehicle body from the axis of the main clutch transmission shaft. As a result, the entire case block may have a reduced vertical dimension. Moreover, with the axis of the pump rotary shaft offset to one side transversely of the vehicle body, the axis of the motor rotary shaft may be offset a small amount to the other side from the axis of the main clutch transmission shaft. This is advantageous in reducing the transverse dimension of the case block as a whole.

Further, in the relation between the axis of the pump rotary shaft and the axis of the motor rotary shaft, the latter is placed below the former. Compared with the case where the two shafts are juxtaposed horizontally, the case block may have a reduced transverse dimension.

Other features, functions, effects and advantages of the present invention will be appreciated upon reading the following description with reference to the accompanying drawings.

DESCRIPTION OF THE PREFERRED EMBODIMENTS

[Overall Construction of Working Vehicle]

Figure 1:
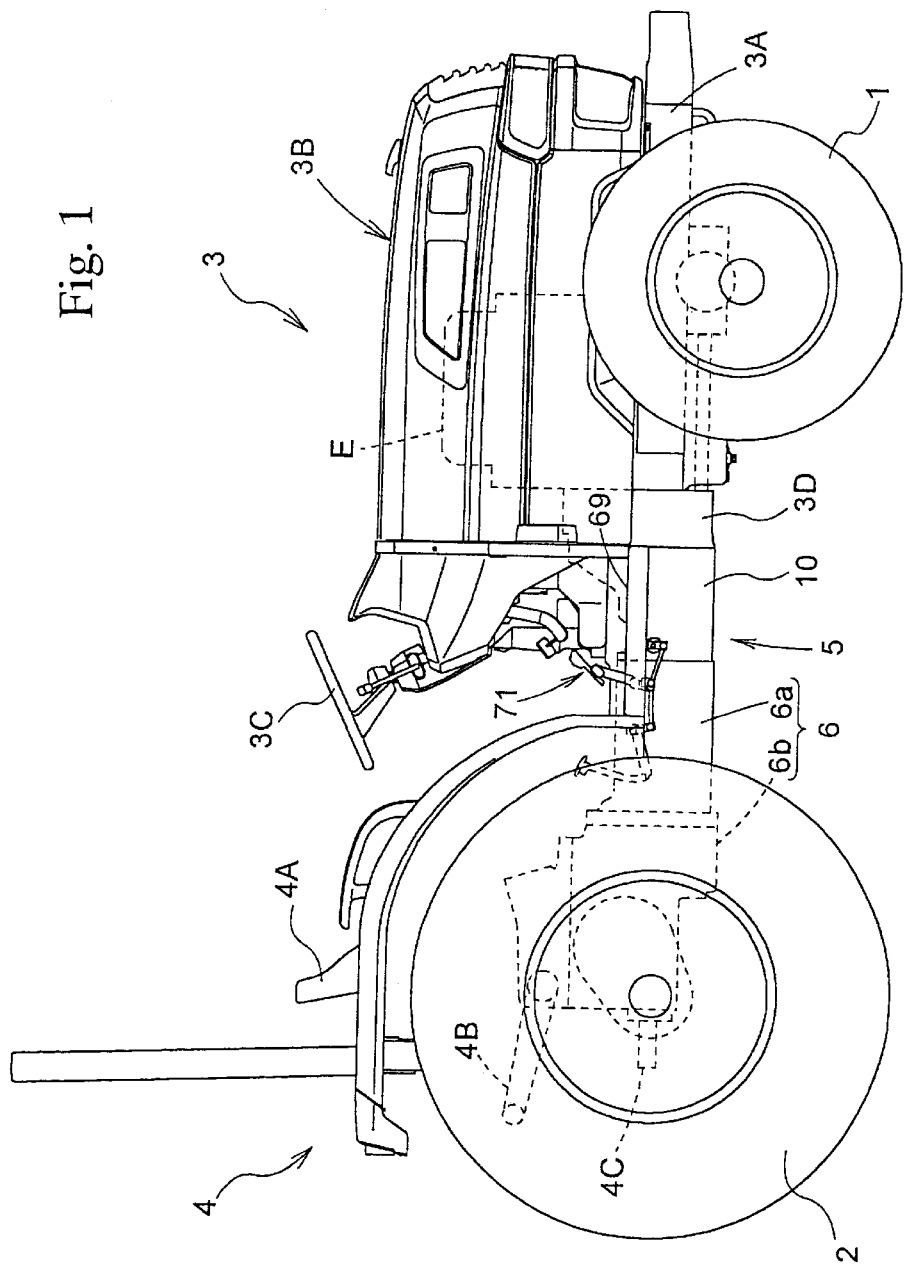
FIG. 1 is a side elevation of an agricultural tractor.

FIG. 1 shows an agricultural tractor which is one example of frameless type working vehicles. This tractor includes a pair of right and left front drive wheels 1 and a pair of right and left rear drive wheels 2 distributed to a front vehicle body 3 and a rear vehicle body 4. The front vehicle body 3 and rear vehicle body 4 are connected to each other through an intermediate vehicle body 5.

The front vehicle body 3 has an engine E, a pair of right and left front frames (only the right frame being shown) 3A integrated with the engine E, a motor section 3B with a hood mounted on the frames 3A and covering the engine E, and a steering wheel 3C for turning the front wheels 1 right and left.

Figure 2:
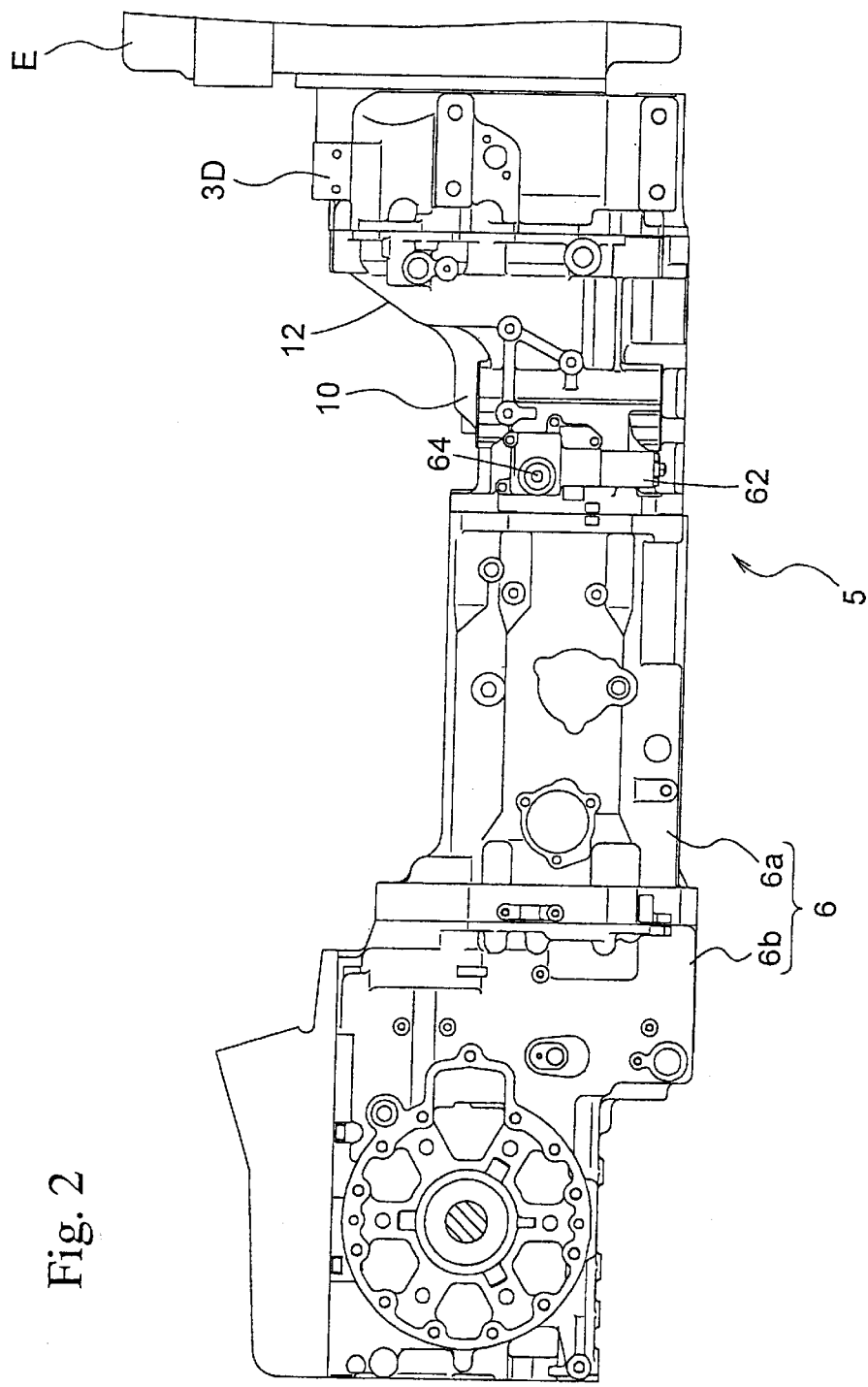
FIG. 2 is a side view showing an outward appearance of vehicle body components.

The rear vehicle body 4 has a propelling transmission case 6 for transmitting propelling drive to the front wheels 1 and rear wheels 2, and a driver's seat 4A disposed above the transmission case 6. The rear vehicle body 4 further includes, disposed in rearward positions thereof, lift arms 4B for vertically movably coupling various working implements to the tractor, and a power takeoff shaft 4C for powering the various working implements coupled to the tractor. As shown in FIGS. 1 and 2, the propelling transmission case 6 is formed of a main transmission case body 6a having a front end thereof connected to a case block 10 acting as the intermediate vehicle body 5, and a differential case portion 6b having a front end thereof bolted to the rear end of main transmission case body 6a.

The intermediate vehicle body 5 is connected directly to the front vehicle body 3 and rear vehicle body 4 to constitute, in combination, a frameless vehicle body. The intermediate vehicle body 5 is formed of the case block 10 with a front end thereof bolted to the rear of a flywheel housing 3D disposed rearwardly of engine E. The rear end of the case block 10 is bolted to the front end of propelling transmission case 6.

This tractor may act as various working vehicles, such as a riding type cultivator with a plow coupled to the rear end thereof.

[Transmission System]

Figure 3:
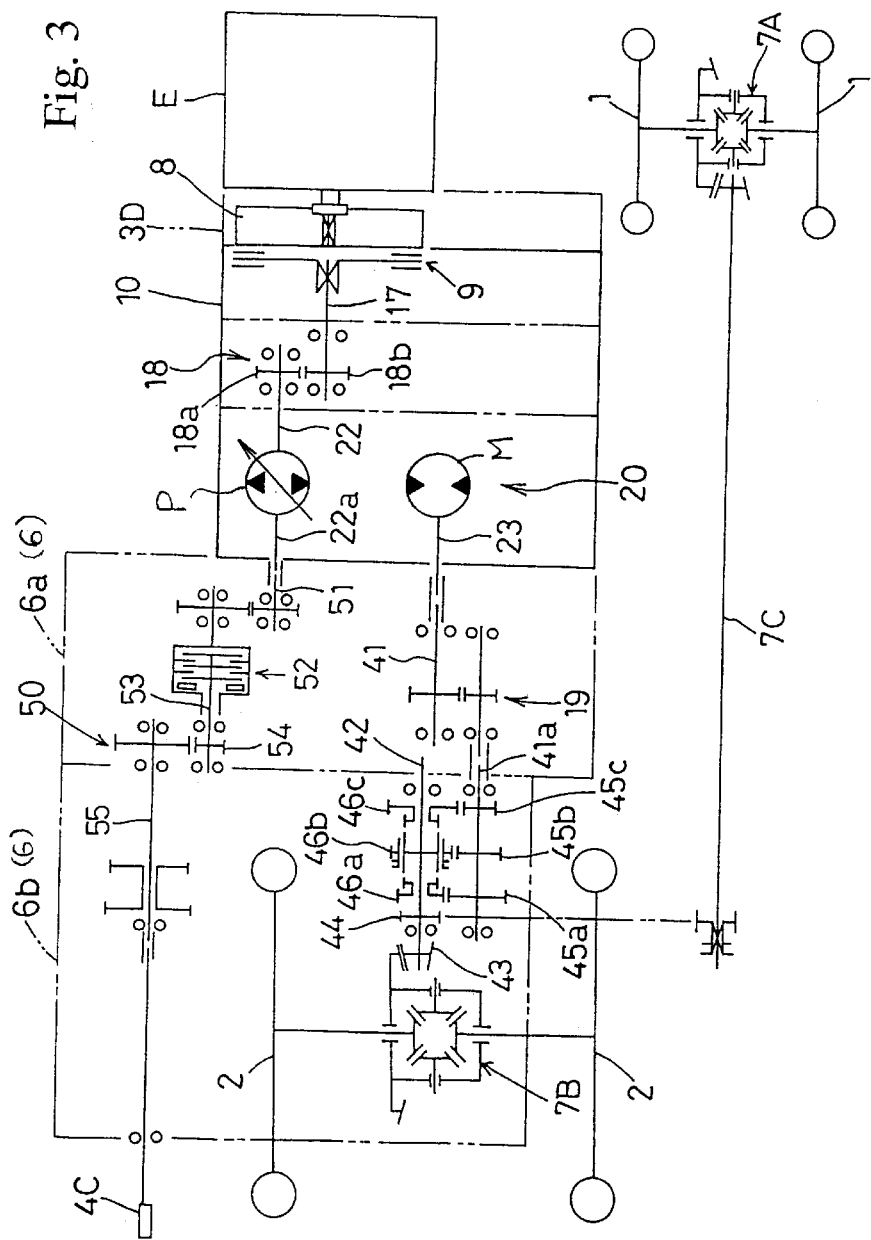
FIG. 3 is a schematic view of a drive transmission system.
Figure 4:
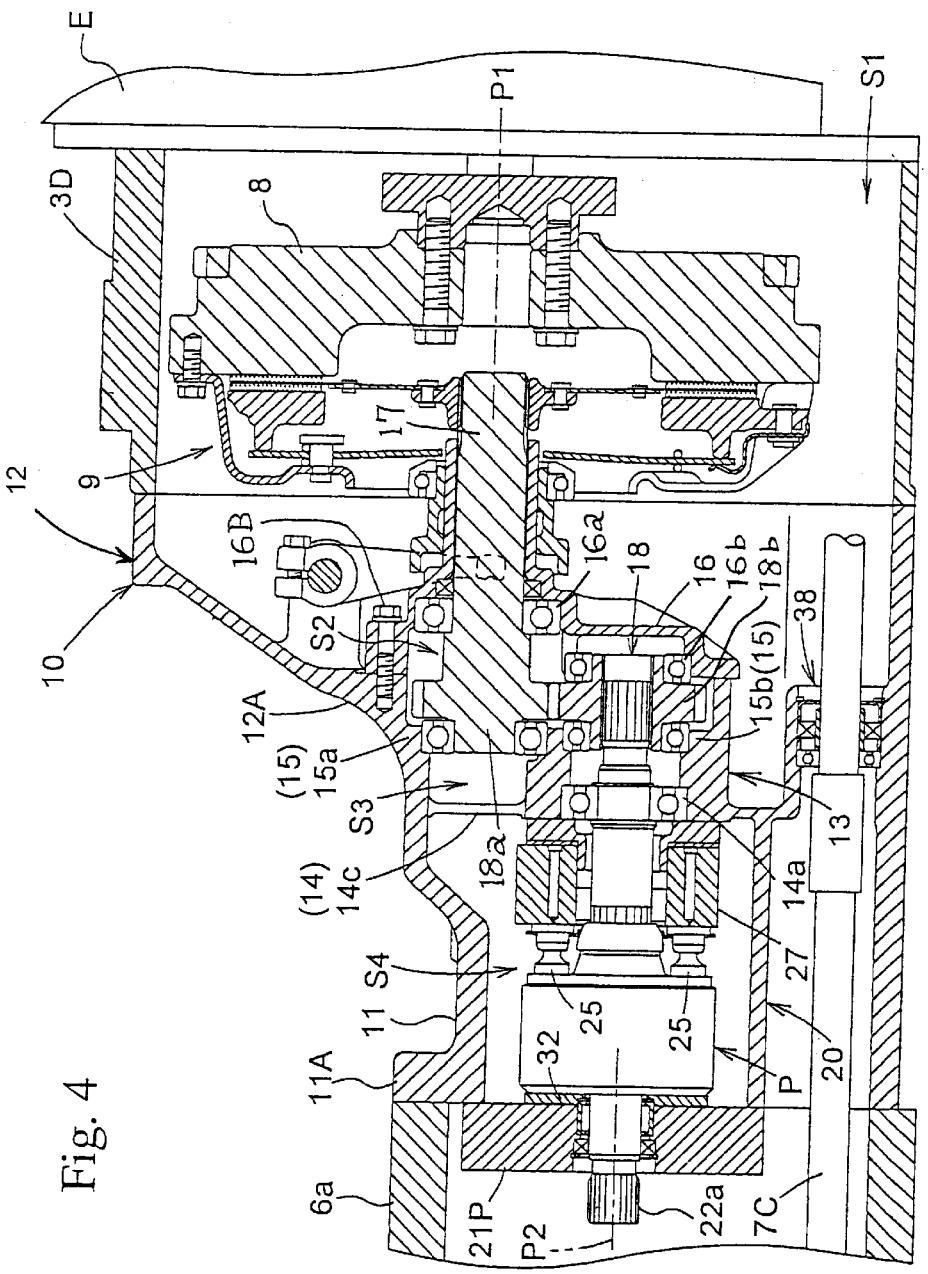
FIG. 4 is a view in vertical section of a case block portion.
Figure 6:
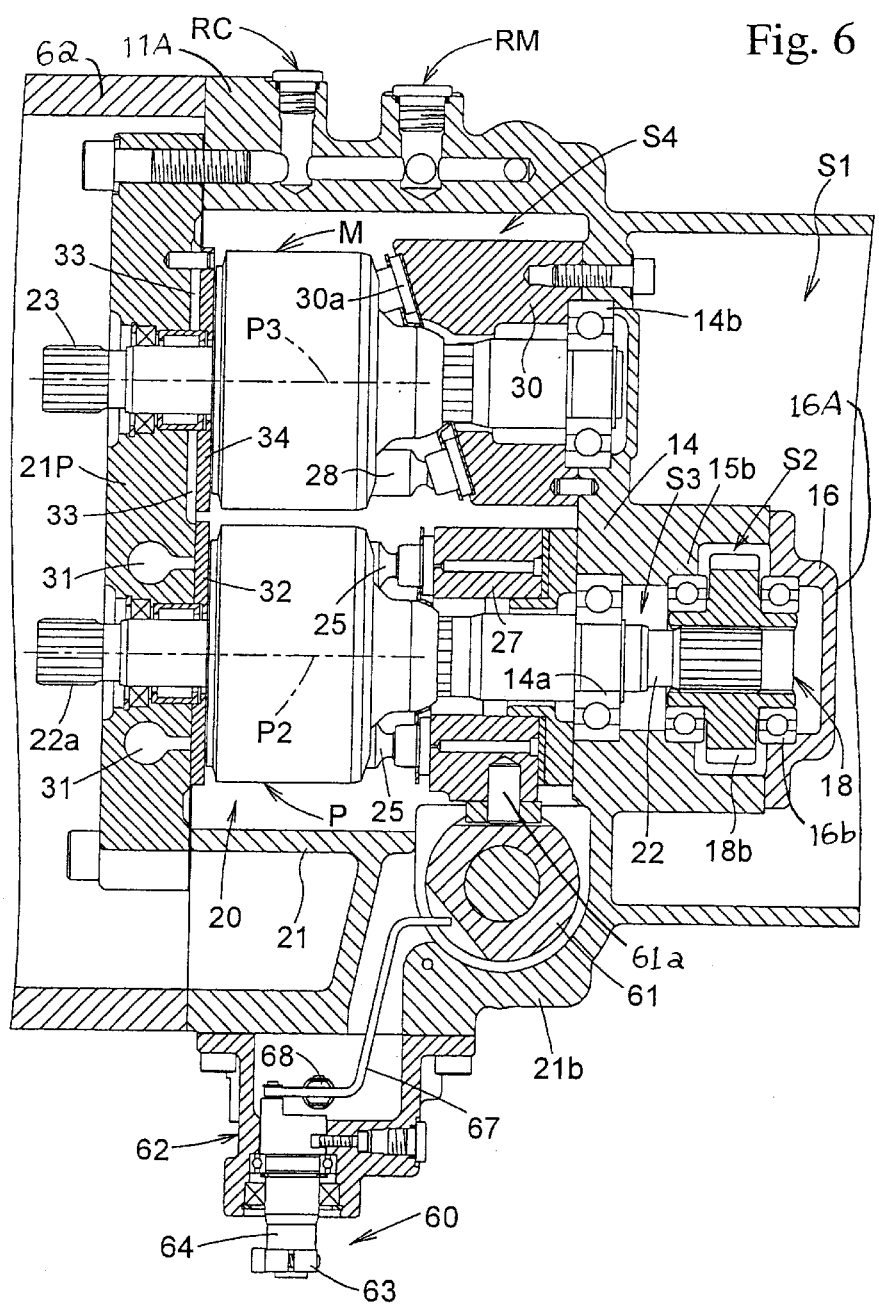
FIG. 6 is a view in horizontal section of the case block portion.

Referring to FIGS. 3, 4 and 6, a front wheel differential mechanism 7A is disposed in an intermediate portion of a front wheel transmission case (not shown) supported by the pair of right and left front frames 3A, while a rear wheel differential mechanism 7B is disposed in the differential case portion 6b (FIG. 1). The tractor is a self-propelled vehicle with a torque output of engine E transmitted through a transmission structure shown in FIG. 3 to the two differential mechanisms 7A and 7B to drive the front and rear wheels 1 and 2.

More particularly, the torque output is transmitted from a flywheel 8 acting as an engine output member mounted in the flywheel housing 3D, through a main clutch 9 operable to connect and disconnect the torque output, and through a transmission shaft (corresponding to the main clutch transmission shaft) 17, to a transmission gear mechanism 18 having an input gear 18a and an output gear 18b. A torque of the output gear 18b of transmission gear mechanism 18 is transmitted to a pump rotary shaft 22 acting as an input shaft of a main propelling change speed device 20 in the form of a hydrostatic stepless transmission (hereinafter abbreviated as HST). The transmission shaft 17 of the main clutch 9 has a forward end thereof connected to the main clutch 9 by spline engagement.

A torque of a motor rotary shaft 23 acting as an output shaft of main propelling change speed device 20 is transmitted through a gear mechanism 19 to an input shaft 41 of an auxiliary propelling transmission (corresponding to the propelling transmission) 40 disposed in the transmission case 6. A torque of an output shaft 42 of the auxiliary propelling transmission 40 is transmitted to the rear wheel differential mechanism 7B through a rear wheel driving output gear 43 formed integrally with the rear end of the output shaft 42. The torque of the output shaft 42 is transmitted also to the front wheel differential mechanism 7A through a front wheel driving output gear 44 attached to the rear end of the output shaft 42 to be rotatable together, and through a front wheel driving transmission shaft 7C having a rear end thereof interlocked to the output gear 44 through a gear mechanism.

The auxiliary propelling transmission 40 has the following construction.

A transmission shaft 41a connected to the input shaft 41 to be rotatable together through a coupling has a low speed gear 45a, an intermediate speed gear 45b and a high speed gear 45c formed integrally therewith. The low speed gear 45a and high speed gear 45c are constantly meshed with a low speed change gear 46a and a high speed change gear 46c relatively rotatably mounted on the output shaft 42, respectively.

Each of the low speed change gear 46a and high speed change gear 46c has an external transmission gear formed peripherally of a boss portion thereof. The output shaft 42 has a shift gear 46b splined to an intermediate position thereof between the low speed change gear 46a and high speed change gear 46c to be rotatable with and slidable relative to the output shaft 42. The shift gear 46b has internal gears formed on opposite end portions thereof for meshing with the external transmission gears formed peripherally of the boss portions of low speed change gear 46a and high speed change gear 46c, respectively.

The shift gear 46b is axially movable in one direction for engaging the low speed change gear 46a, and in the other direction to engage the high speed change gear 46c. When placed in the middle position, the shift gear 46b engages the intermediate speed gear 45b on the transmission shaft 41a. Thus, torque from the main propelling change speed device 20 is subjected to an auxiliary change speed operation to be transmitted in three speeds to the front and rear wheels 1 and 2.

The power takeoff shaft 4C is rotatably supported at the rear of propelling transmission case 6. The power takeoff shaft 4C extends from an implement driving transmission 50 disposed in the propelling transmission case 6. The implement driving transmission 50 receives drive from the engine E through an extension shaft portion 22a of the input rotary shaft 22 of the main propelling change speed device 20, and through a shaft coupling.

The implement driving transmission 50 has an input shaft 51 connected to the extension shaft portion 22a of the input rotary shaft 22 of the main propelling change speed device 20. The implement driving transmission 50 further includes an implement clutch 52 of the multidisk type engageable by pressure oil supplied thereto. The implement clutch 52 has an output shaft 53 connected through a gear mechanism 54 to one end of a rotary shaft 55. The rotary shaft 55 is connected at the other end thereof to the power takeoff shaft 4C to be rotatable together. With the implement driving transmission 50 having the above construction, the torque output of engine E is transmitted thereto as branched from the propelling line. As a result, the drive is transmitted to the implement driving transmission 50 without change in speed, regardless of shifting operations of the main propelling change speed device 20 and auxiliary propelling transmission 40. The drive branched off is transmitted to the power takeoff shaft 4C through the implement clutch 52 operable to connect and disconnect the drive.

[Case Block]

The front vehicle body 3 and rear vehicle body 4, with the above transmission structure mounted therein, are connected through the intermediate vehicle body 5 in the form of the case block 10 housing the main propelling change speed device or HST 20. This case block 10 has the following construction.

As shown in FIGS. 4 through 8, the case block 10 of the main propelling change speed device 20 includes a change speed block portion (corresponding to the small diameter portion) 11 providing case walls for a hydraulic pump P and a hydraulic motor M, and a large diameter portion 12 formed integrally with the block portion 11 and having an upper edge rising above the upper surface of the block portion 11.

The large diameter portion 12 has a flange formed peripherally thereof and connected to the rear end of flywheel housing 3D disposed rearwardly of engine E. The large diameter portion 12 defines an accommodating space S1 in a recessed interior thereof for accommodating the main clutch 9.

Between the upper surface of change speed block portion 11 providing the case walls of the hydraulic pump P and hydraulic motor M of the main propelling change speed device 20, and the upper edge of the large diameter portion 12 defining the accommodating space S1 for the main clutch 9, an inclined wall (one example of transitional portion) 12A is formed to provide a case sectional profile gradually changing from the change speed block portion (small diameter portion) 11 to the large diameter portion 12. A shaft supporting wall portion 13 is provided in a case interior including the inclined wall 12A, for supporting the clutch transmission shaft 17 extending from the main clutch 9, and the pump rotary shaft 22 extending from the hydraulic pump P.

On the other hand, the change speed block portion (small diameter portion) 11, the large diameter portion 12 and the inclined wall (transitional portion) 12A have respective lower surfaces continuing at the same level.

The shaft supporting wall portion 13 includes a first partition 14 closest to the hydraulic pump P and hydraulic motor M, a third partition 16 closest to the main clutch 9, and a second partition 15 disposed between the first partition 14 and third partition 16.

The first partition 14 has bearings 14a and 14b for supporting forward end regions of the pump rotary shaft 22 and motor rotary shaft 23, respectively. The pump rotary shaft 22 extends forward through the first partition 14.

The second partition 15 has a bearing 15b for supporting the rearward end of the transmission gear 18b mounted on an end of the pump rotary shaft 22, and a bearing 15a for supporting the rearward end of the transmission gear 18a formed on a rear end region of the transmission shaft 17 extending from the main clutch 9.

The third partition 16 has bearings 16a and 16b for supporting forward ends of the two transmission gears 18a and 18b, respectively, and a lid member 16A for dividing an arranging space S2 of the transmission gears 18a and 18b from the accommodating space S1 of the main clutch 9. The lid member 16A is detachably attached to the second partition 15 by connecting bolts 16B.

The second partition 15 is disposed in the transitional portion between the small diameter portion and large diameter portion 12. That is, the second partition 15 is disposed adjacent a boundary between the upper surface of the change speed block portion 11 providing the case walls of the hydraulic pump P and hydraulic motor M, and the inclined wall providing the gradually changing case sectional profile. The first partition 14 is formed closer to the change speed block portion 11 than the second partition 15. The third partition 16 is disposed closer to the upper end of the inclined wall 12A, i.e. closer to the large diameter portion 12, than the second partition 15.

Figure 5:
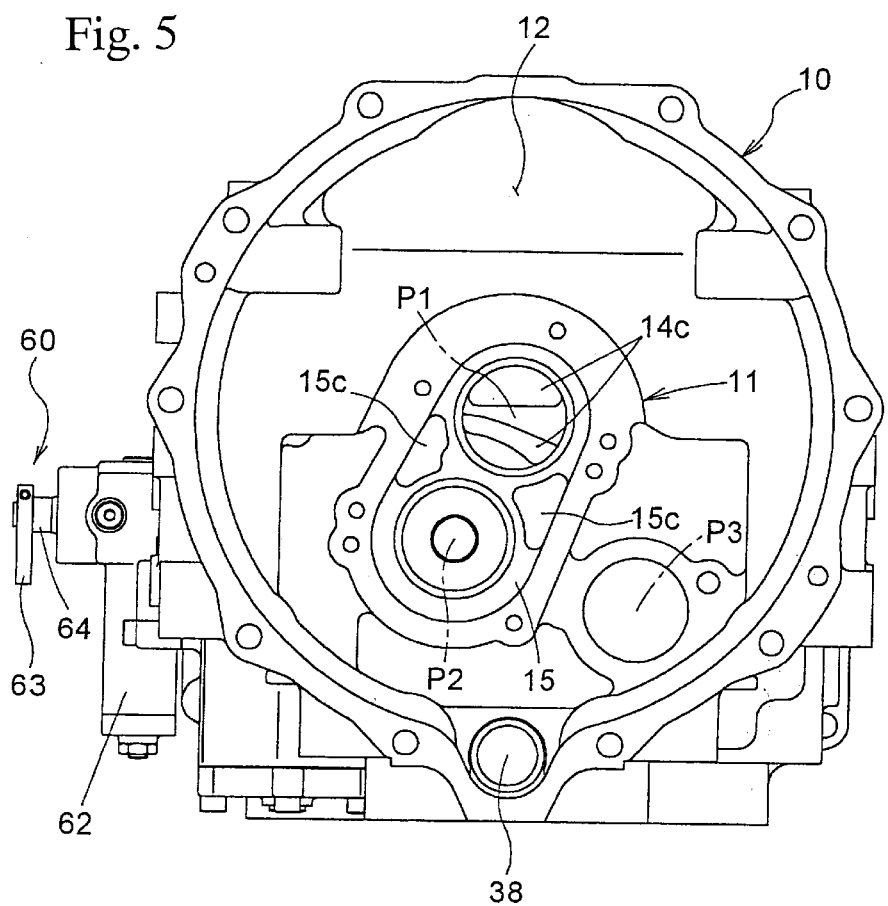
FIG. 5 is a front view of the case block portion.

The arranging space S2 of transmission gears 18a and 18b bounded by the third partition 16 and second partition 15 communicates with a passage space S3 formed between the second partition 15 and first partition 14, through communicating bores 15c formed in the second partition 15 as shown in FIG. 5. Further, the passage space S3 communicates with a change speed chamber space S4 housing the main propelling change speed device 20, through openings 14c formed in upper positions of the first partition 14.

Thus, the arranging space S2 of transmission gears 18a and 18b, the passage space S3 and the change speed chamber space S4 constitute a common space for circulating pressure oil. This common space is partitioned from, to be out of communication with, the accommodating space S1 of the main clutch 9 to which pressure oil is not supplied.

Figure 7:
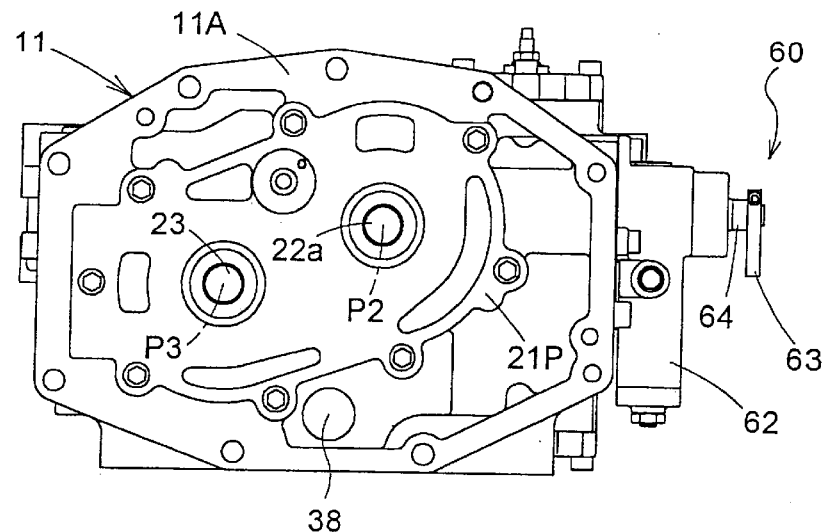
FIG. 7 is a rear view of the case block portion.
Figure 8:
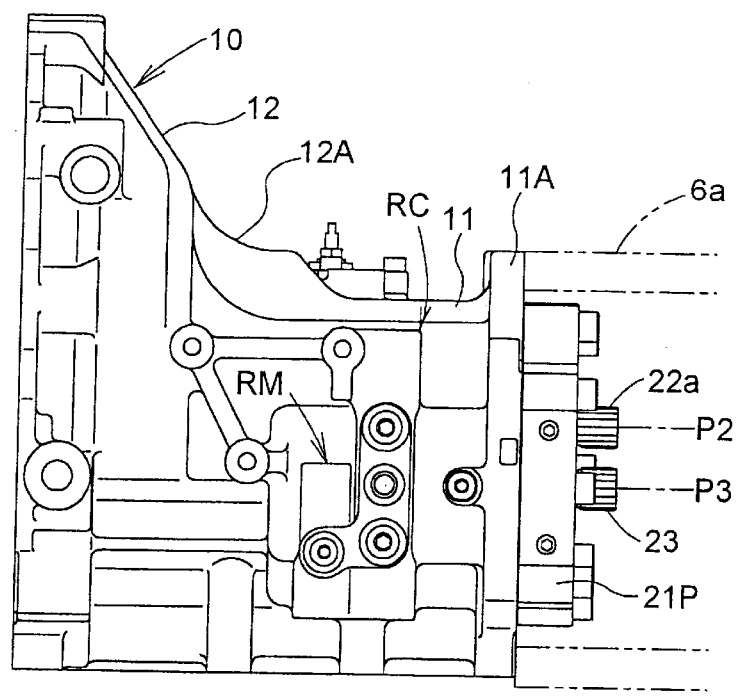
FIG. 8 is a side view of the case block portion.
Figure 9:
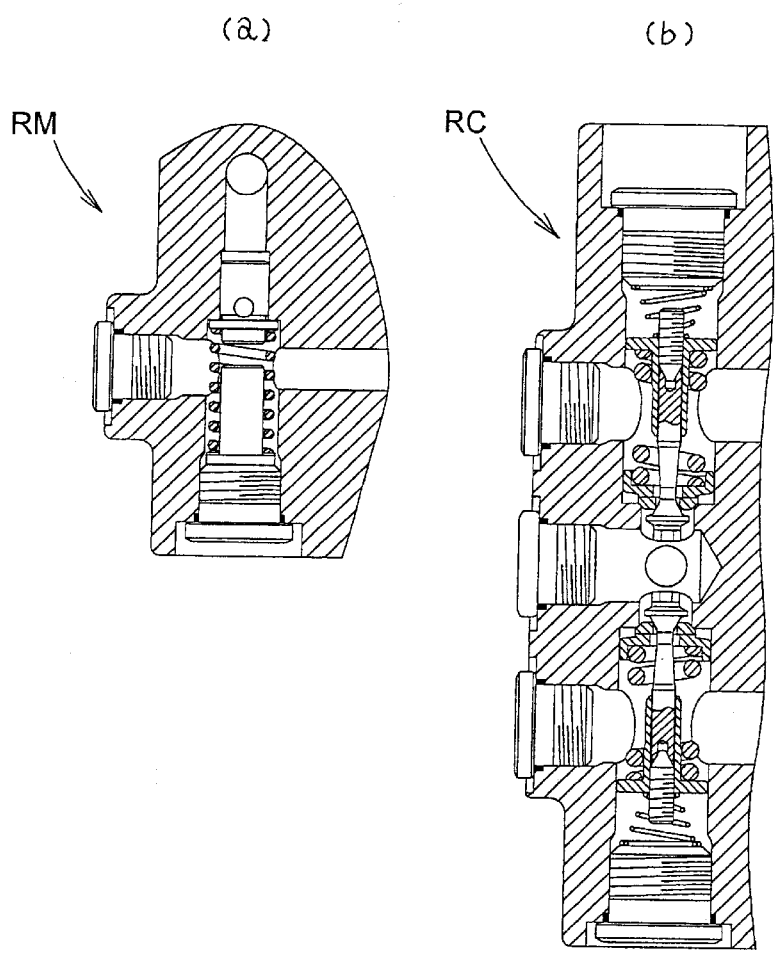
FIG. 9 shows views, partly in section, of a charge valve portion, in which (a) shows a main relief valve for setting a charge pressure, and (b) shows a charge relief valve.

As shown in FIGS. 6 through 8, the change speed block portion 11 is in the form of a block having a case peripheral wall 21 made of cast iron, and a port block 21P made of cast iron and bolted to a rear end surface of the case peripheral wall 21. The port block 21P is disposed inwardly of a joining surface of a flange 11A formed for bolt connection to the main propelling transmission case body 6a. When the case block 10 is connected to the main propelling transmission case body 6a, part of the port block 21P protrudes into the main propelling transmission case body 6a as shown in phantom lines in FIG. 8.

As shown in FIG. 5, the pump rotary shaft 22 has an axis P2 located below and offset to one side from the axis P1 of the transmission shaft 17 extending from the main clutch 9. The motor rotary shaft 23 has an axis P3 located below and offset to the other side from the axis P2 of the pump rotary shaft 22.

With this arrangement, compared with the case of the axis P2 of the pump rotary shaft being located directly under the axis P1 of the main clutch transmission shaft 17, the vertical distance between the two axes P1 and P2 is reduced, slightly as it may be. In addition, the axis P2 may be offset to one side of the axis P1 (e.g. leftward of the vehicle body in this embodiment).

As a result, the case block as a whole has a slightly reduced vertical dimension. With the axis P2 of the pump rotary shaft offset to one side, the axis P3 of the motor rotary shaft may be offset by a small amount to the other side from the axis P1 of the main clutch transmission shaft. This is effective for reducing an overall transverse dimension.

Further, the relationship between the axis P2 of the pump rotary shaft and the axis P3 of the motor rotary shaft is such that the axis P3 is located below the axis P2. Thus, compared with the case of the two axes arranged on a horizontal plane, a reduced transverse dimension may be achieved. This aspect also is effective for compactness and lightness of the case block 10.

As shown in FIGS. 4, 5 and 7, the case block 10 has a through hole 38 extending longitudinally through a lowermost position thereof. The front wheel driving transmission shaft 7C is disposed in the through hole 38. Thus, the front wheel driving transmission shaft 7C is placed at a level above the ground raised to adjacent the lower edge of large diameter portion 12.

[Main Propelling Change Speed Device]

As shown in FIGS. 4 through 8, the main propelling change speed device has, arranged in the change speed block portion 11, the hydraulic pump P of the variable displacement type driven by the input shaft 22 acting as drive shaft, and the hydraulic motor M of the fixed displacement type driven by pressure oil from the hydraulic pump P and having the rotary shaft 23 acting as output shaft.

With this construction, the main propelling change speed device 20 is disposed adjacent and rearwardly of the main clutch 9. The hydraulic pump P and hydraulic motor M convert engine output transmitted and inputted to the pump rotary shaft 22 into forward drive and backward drive. Speed of both the forward drive and backward drive is steplessly changed and outputted from the motor rotary shaft 23 to the auxiliary propelling transmission 40. More particularly, the main propelling change speed device 20 is constructed as described hereinafter.

The change speed block portion 11 is in the form of a block having the case peripheral wall 21 made of cast iron and accommodating the hydraulic pump P and hydraulic motor M along with pressure oil, and the port block 21P made of cast iron and bolted to the rear end surface of the case peripheral wall 21.

The case peripheral wall 21 has a flange portion formed at the rear end thereof for bolt connection to the main propelling transmission case body 6a acting as part of the rear vehicle body 4.

The port block 21P has bearings for rotatably supporting the output rotary shafts 22 and 23 of the hydraulic pump P and hydraulic motor M, respectively. Further, the port block 21P defines oil passages for circulating pressure oil between the hydraulic pump P and hydraulic motor M.

The hydraulic pump P and hydraulic motor M are arranged transversely of the vehicle body, in the change speed chamber space S4 serving as an oil chamber inside the case peripheral wall 21.

The hydraulic pump P is an axial plunger pump. A plurality of plungers 25 are sidably mounted in a cylinder block 26, which are arranged around the pump rotary shaft 22 acting as the input rotary shaft of the main propelling change speed device 20. The cylinder block 26 is rotatable by the rotary shaft 22 about the axis of the latter. An annular swash plate 27 mounted at one end of the rotary shaft 22 is oscillatable relative to the change speed block portion 11.

The hydraulic motor M is an axial plunger motor. A plurality of plungers 28 are sidably mounted in a cylinder block 29, which are arranged around the motor rotary shaft 23 acting as the output rotary shaft of the main propelling change speed device 20. The cylinder block 29 is rotatable with the rotary shaft 23. With a rotation of cylinder block 29, a swash plate 30 formed integrally with the case peripheral wall 21 inside the change speed block portion 11 causes the plungers 28 to slide back and forth relative to the cylinder block 29. The swash plate 30 of the motor M has a cam plate attached thereto and defining a cam surface 30a. The cam surface 30a is inclined rearwardly as it extends laterally outwardly of the vehicle body.

As shown in FIG. 6, the hydraulic pump P has intake and drain ports 31 arranged transversely of the vehicle body and formed in inner walls of the port block 21P and in a valve plate 32 fixed to the port block 21P. On the other hand, the hydraulic motor M has intake and drain ports 33 arranged vertically of the vehicle body, to be different from the arrangement of the intake and drain ports 31 of the pump P, and formed in inner walls of the port block 21P and in a valve plate 34 fixed to the port block 21P. One of the intake and drain ports 31 of the pump and one of the intake and drain ports 33 of the motor are connected through one of the oil passages formed in the port block 21P. The other of the intake and drain ports 31 of the pump and the other of the intake and drain ports 33 of the motor are connected through the other oil passage formed in the port block 21P. As a result, pressure oil is circulated between the hydraulic pump P and hydraulic motor M.

As shown in FIGS. 6 through 11, the change speed block portion 11 has, mounted laterally thereof adjacent the hydraulic pump P, a control unit 60 for changing a swash plate angle of the hydraulic pump P. The control unit 60 includes a hydraulic servo cylinder 61 mounted, to extend vertically of the vehicle body, in a mounting bore of a cylinder mount 21b formed integrally with the case peripheral wall 21, and a hydraulic servo valve 62 mounted on an outer wall of the cylinder mount 21b to extend vertically of the vehicle body.

Figure 10:
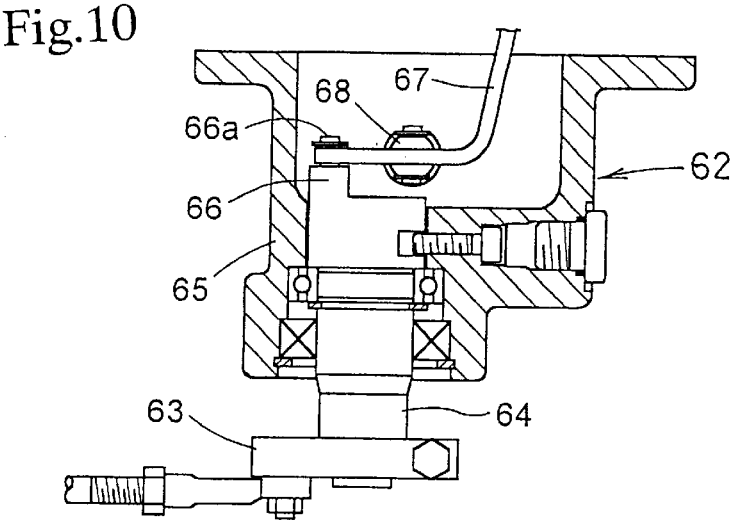
FIG. 10 is a sectional view of a servo valve controller.
Figure 11:
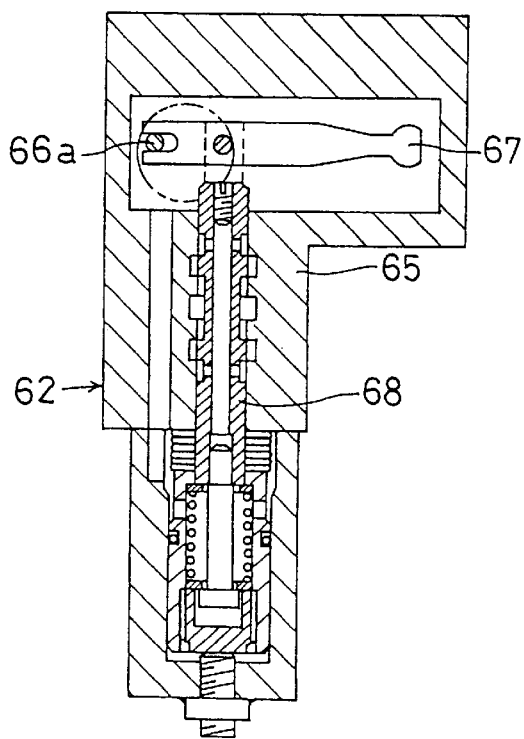
FIG. 11 is a sectional view of a servo valve.

More particularly, as shown in FIGS. 10 and 11, the servo valve 62 has a control lever 63 supported by a valve case 65 through a rotary support shaft 64. When the control lever 63 is turned about the axis of the rotary support shaft 64, the rotary support shaft 64 rotates with the control lever 63. This causes a control portion 66 extending from the rotary support shaft 64 inside the valve case 65 to swing about the axis of the rotary support shaft 64. Next, a valve control link 67 connected at one end thereof to the control portion 66 through a connecting pin 66a is swung about the other end of the valve control link 67 connected to the servo cylinder 61. That is, the pivotal point of the control unit 60 changes from one end (left end in FIG. 11) to the other end (right end in FIG. 11) of the valve control link 67.

Then, a connecting pin 67a connecting an intermediate position of the valve control link 67 to a valve spool 68 moves in the same direction as the connecting pin 66a, to switch the valve spool 68 from a neutral position to a drive position. As a result, the servo cylinder 61 is driven by pressure oil, and a control pin 61a (see FIG. 6) projecting from the servo cylinder 61 and engaging the swash plate 27 swings the swash plate 27 in an accelerating or decelerating direction, in a traveling direction (forward or backward) corresponding to a direction of operation of the control lever 63. The servo cylinder 61 swings the swash plate 27 while swinging the valve control link 67 about the connecting pin 66a. When a swing angle of swash plate 27 reaches an angle proportional to an operating stroke of the control lever 63, the connecting pin 67a returns to a neutral position to return the valve spool 68 to the neutral position.

Thus, when the angle of swash plate 27 is changed in the direction corresponding to the direction of operation of the control lever 63 and by an angle proportional to an operating stroke of the control lever 63, the servo valve 62 automatically returns to neutral, and the servo cylinder 61 stops to stop the swinging of the swash plate 27.

[Hydraulic Circuit]

A hydraulic circuit for supplying a charge pressure to the main propelling change speed device 20 is constructed as follows.

Figure 12:
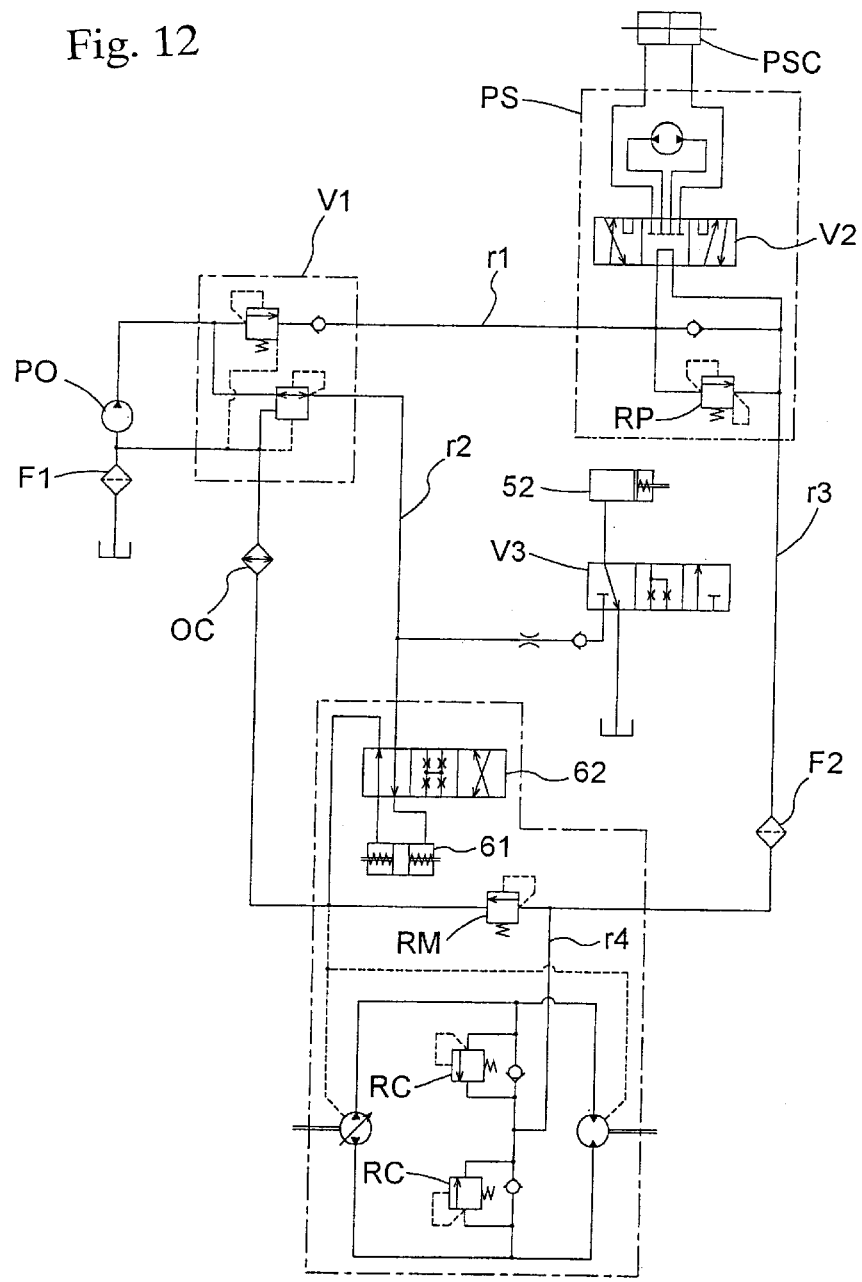
FIG. 12 is a hydraulic circuit diagram.

As shown in FIG. 12, oil discharged from a pressure oil supply pump PO driven by the engine is divided by a regulator valve V1 to a supply oil line r1 extending to a power steering device PS, and a supply oil line r2 extending to the servo cylinder 61 of main propelling change speed device 20 and the PTO clutch 52.

Specifically, the pressure oil supply pump PO delivers pressure oil at a pressure of about 150 kg/cm$^2$, and the regulator valve V1 distributes the oil at appropriate pressures, e.g. about 140 kg/cm$^2$ for the power steering device PS, and about 25 kg/cm$^2$ for the oil line to the servo cylinder 61 and PTO clutch 52.

A lower pressure (about 10 kg/cm$^2$) than the above pressures is desirable for a charge pressure oil line r4 extending to the main propelling change speed device 20. Its flow rate tends to be variable.

Thus, if a supply line exclusively for a charge pressure extended from the pressure oil supply pump PO, an additional regulator valve and an exclusive oil line would be required. Moreover, a great pressure reduction would be required.

It is conceivable to take a charge pressure as reduced in pressure from the supply oil line r2 for the servo cylinder which has a relatively close set pressure. However, pressure oil is supplied at a low flow rate to the supply oil line r2 for the servo cylinder, and operation of the servo cylinder will become unstable unless pressure oil is supplied at a required rate. This measure is therefore undesirable since the pressure oil for the serve cylinder line is decreased in time of charging, which could destabilize operation of the servo cylinder 61 and PTO clutch 52.

This invention takes note of the fact that pressure may be reduced for a return oil line r3 from the power steering device PS to which pressure oil is supplied at a relatively high flow rate. Thus, a main relief valve RM for charge pressure setting is provided on the return oil line r3 to take a charge pressure from the return oil line r3, and a relief pressure is set to correspond to the above pressure. With this construction, return oil from the power steering device PS is used as charge pressure for the main propelling change speed device 20.

The regulator valve V1 discharges pressure oil at a discharge pressure of about 140 kg/cm$^2$ to the supply line r1 for the power steering device PS. When the pressure rises with an increase in operating resistance at the power steering device PS, for example, the oil may be released to the return oil line r3 through a steering pressure setting relief valve RP with a relief pressure set thereto corresponding to the above discharge pressure.

When a control valve V2 of the power steering device PS is in a neutral position (for directing the vehicle straight) as shown in FIG. 12, the pressure oil flows from the supply line r1 through a neutral port of the control valve V2 into the return oil line r3. The oil pressure becomes the pressure (about 10 kg/cm$^2$) set by the charge pressure setting main relief valve RM provided on the return oil line r3.

Charge oil is supplied from the return oil line r3 to the oil circulating passages of the main propelling change speed device 20 through the charge pressure oil line r4 branched from the return oil line r3 upstream of the charge pressure setting main relief valve RM.

The main propelling change speed device 20 has charge relief valves RC for performing a relief operation at a higher pressure than the charge pressure setting main relief valve RM. In the oil circulating passages of the main propelling change speed device 20, because of rotating directions of the hydraulic pump P and hydraulic motor M, one part (from hydraulic pump P to hydraulic motor M is at high pressure, and the other part (from hydraulic motor M to hydraulic pump P) at low pressure.

The charge relief valves RC comprise a pair of charge relief valves RC arranged on an oil passage extending between a high pressure oil passage and a low pressure oil passage, and having opposite oil passing directions. These relief valves RC and check valves constitute a charge oil introducing valve mechanism. The pressure oil supplied from the charge pressure supply line r4 is introduced into the pressure oil circulating passage through the check valve leading to the low pressure oil passage of the main propelling change speed device 20.

When the high pressure oil passage of the oil circulating passages exceeds a predetermined high pressure due to a heavy load acting on the hydraulic motor M, for example, pressure oil may be short-circuited from the high pressure passage to the low pressure passage through the charge relief valve RC connected to the high pressure passage and the check valve permitting an oil flow to the low pressure passage.

Return oil having passed through the charge pressure setting main relief valve RM on the return oil line r3 is cooled by an oil cooler OC. Then, part of the return oil is supplied as replenishment to the regulator valve V1, while the rest is supplied to the intake port of the pressure oil supply pump PO. During operation, the return oil is circulated for use instead of flowing back to an oil tank.

As shown in FIGS. 6 through 9, the charge pressure setting main relief valve RM and charge relief valve RC have valve closure members and biasing springs mounted in valve cases formed integrally with, by boring, a lateral wall of the change speed block portion 11. The set pressures are adjustable by varying biasing spring pressures with screws turned from outside.

In FIG. 12, the reference PSC denotes a power steering cylinder, and F1 and F2 denote filters.

[Shifting Mechanism]

A shifting mechanism 70 for shifting the main propelling change speed device 20 includes a shift pedal device 71 disposed on a deck 69 of a driving platform.

Figure 13:
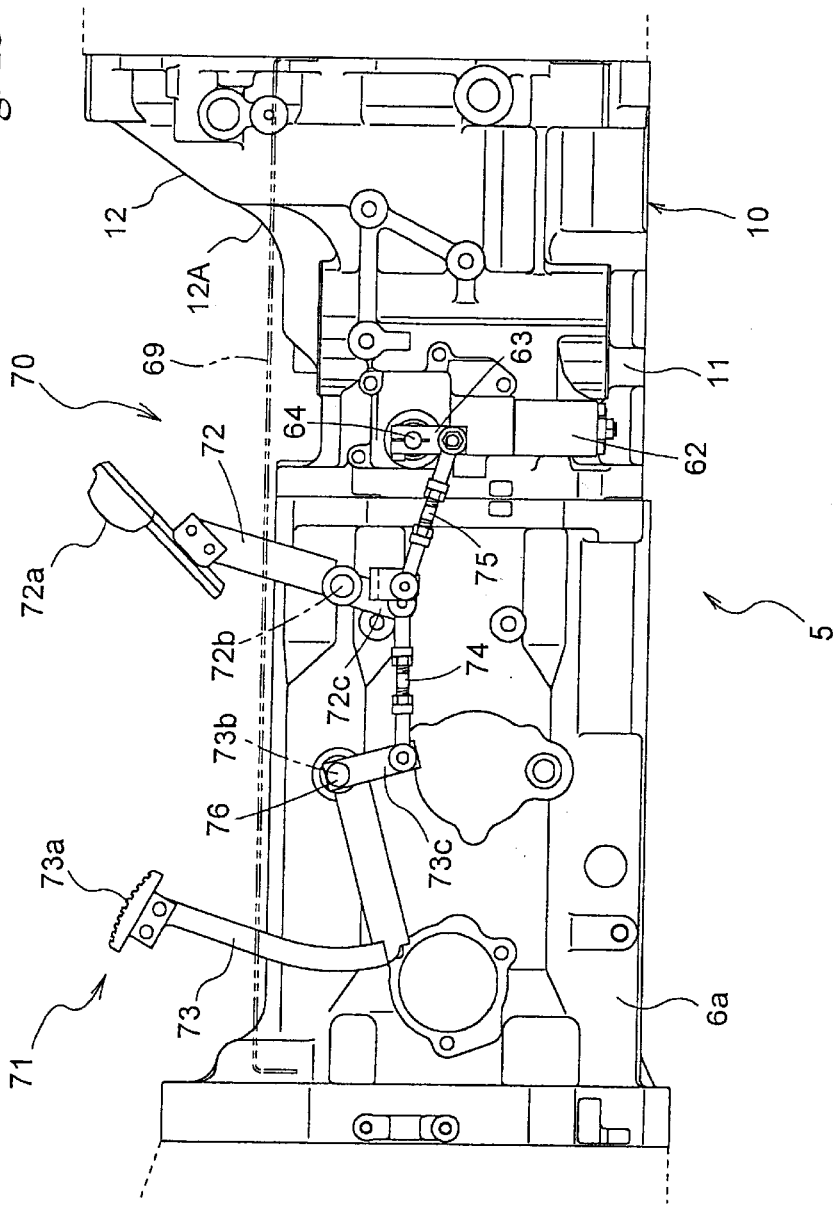
FIG. 13 is a side view of a shift pedal and a shift control mechanism.
Figure 14:
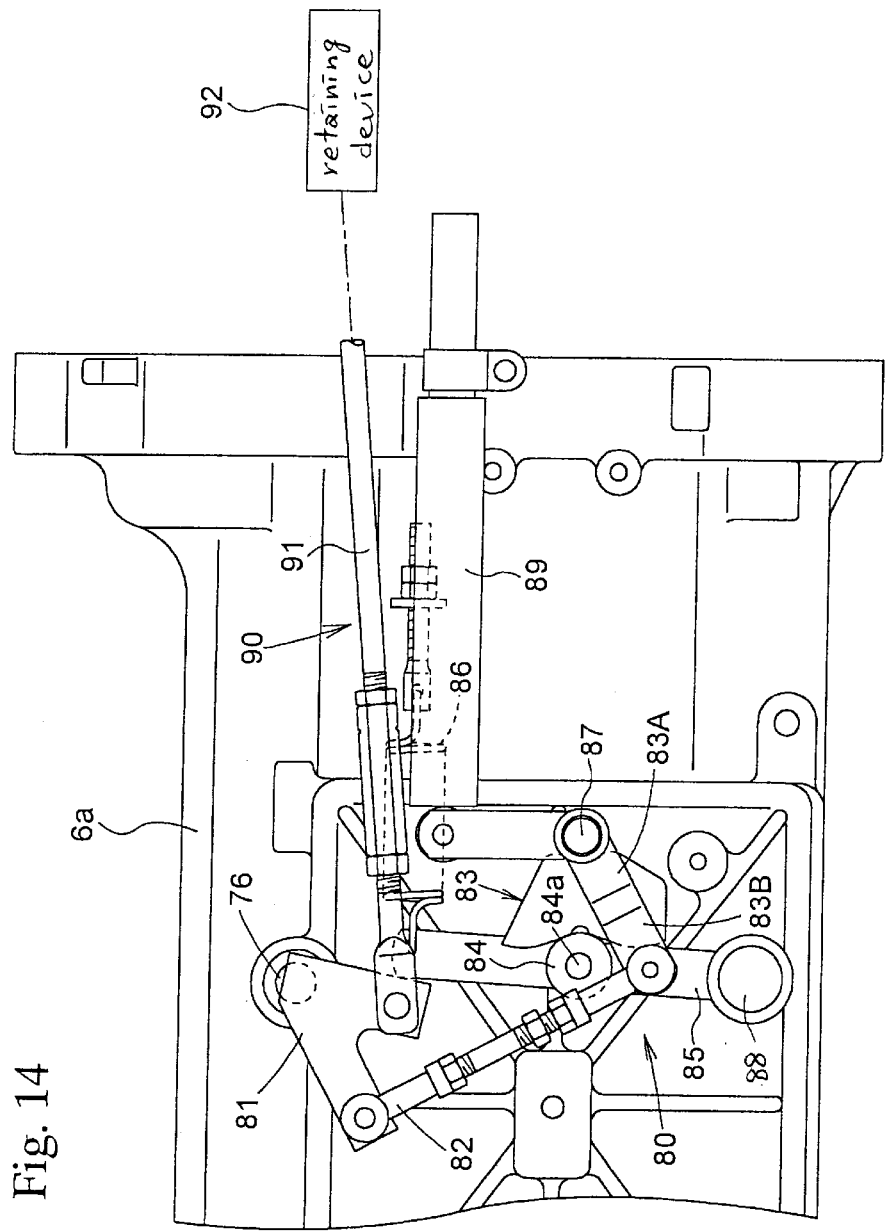
FIG. 14 is a side view showing a neutral restoring mechanism and a cruising device.

The shifting mechanism 70 transmits an operation of the shift pedal device 71 to the control lever 63 of the servo valve 62, and is constructed as shown in FIGS. 13 and 14.

The shift pedal device 71 includes a pair of front and rear control pedals 72 and 73 and a link member 74 linking the two pedals 72 and 73. The front, forward speed control pedal 72 defines a forward speed control tread 72a, while the rear, backward speed control pedal 73 defines a backward speed control tread 73a. The forward speed control tread 72a is displaced laterally outwardly with respect to the backward speed control tread 73a. Thus, the forward speed control tread 72a may be depressed easily with a toe, while the backward speed control tread 73a may be depressed easily with a heel. The link member 74 is in the form of a turnbuckle for linking the two pedals mechanically and to be adjustable in length. This allows the forward speed control tread 72a and backward speed control tread 73a to be operable as linked to each other.

The forward speed control pedal 72 of shift pedal device 71 is disposed in such a position that the main propelling change speed device 20 lies forwardly of a pivotal axis 72b of the control pedal 72, and that the control tread 72a overlaps the rear end of the main propelling change speed device 20 in plan view. The forward speed control pedal 72 is supported to be pivotable about the pivotal axis 72b provided on a side surface of the vehicle body.

The forward speed control pedal 72 has a control arm 72c opposed to the forward speed control tread 72a across the pivotal axis 72b. The control arm 72c is operatively connected, through a control member 75 in the form of a turnbuckle adjustable in length, to the control lever 63 of servo valve 62 provided on a side surface of the case block 10. Thus, the forward speed control pedal 72 and control lever 63 are interlocked so that the servo valve 62 is operable by pedal operation.

On the other hand, the backward speed control pedal 73 of shift pedal device 71 is attached to be pivotable about a pivotal axis 73b disposed rearwardly of the forward speed control pedal 72. The backward speed control pedal 73 has a control arm 73c opposed to the rearward speed control tread 73a across the pivotal axis 73b. The control arm 73c is operatively connected through the link member 74 to the control arm 72c of the forward speed control pedal 72. Thus, the rearward speed control pedal 73 also is interlocked to the control lever 63 so that the servo valve 62 is operable by pedal operation.

The pivotal axis 73b of backward speed control pedal 73 is provided by a shaft 76 extending transversely through the propelling transmission case 6. The backward speed control pedal 73 and shaft 76 are rigidly interconnected to be pivotable together.

On the side surface of the propelling transmission case 6 remote from the shift pedal device 71 and servo valve 62, and as associated with the shaft 76 extending through the propelling transmission case 6, a neutral return mechanism 80 is provided to act on the main propelling change speed device 20, and a cruising device 90 is provided for manually maintaining the shift pedal device 71 in a fixed depressed position. The neutral return mechanism 80 and cruising device 90 will be described hereinafter with reference to FIG. 14.

The neutral return mechanism 80 includes a bifurcated swing member 81 attached to a projecting end of the shaft 76 to be pivotable with rotation of the shaft 76, a rod 82 linked to the swinging member 81 to be pivotable relative thereto, a cam member 83 linked to an end of the rod 82 to be pivotable relative thereto, a cam follower 85 with a cam roller 84 biased to press against the cam member 83, and a biasing member 86 for pressing the cam follower 85 against the cam member 83.

The cam member 83 is pivotably mounted on a pivot shaft 87 provided on the side surface of propelling transmission case 6. The cam member 83 has a sector cam 83A defining a cam surface 83a with a recess formed in an intermediate position thereof in a pivoting direction, and a swing link 83B pivotally attached to the pivot shaft 87 to be pivotable with the sector cam 83A. The swing link 83B is connected at a free end thereof to the rod 82, whereby a swinging of swing member 81 causes the cam member 83 to pivot about the pivot shaft 87.

The cam follower 85 is in the form of a swing rod pivotably mounted on a pivot shaft 88 provided on the side surface of propelling transmission case 6. The cam roller 84 is mounted in a longitudinally intermediate position of this swing rod to be rotatable about a support shaft 84a.

The biasing member 86 is in the form of a coil spring with one end engaged with a free end of the cam follower 85 and the other end fixed to the side surface of the propelling transmission case. The biasing member 86 presses the cam roller 84 against the cam surface 83a of cam member 83. When the main propelling change speed device 20 is in neutral, the biasing member 86 is stabilized with the cam member 83 receiving the cam roller 84 in the recess formed in the cam surface 83a.

Numeral 89 in FIG. 14 denotes a damper connected at one end thereof to the cam follower 85 and the other end pivotally attached to the side surface of the propelling transmission case. Thus, even when vibration is transmitted from the swash plate 27 of main propelling change speed device 20 to the control lever 63 and shift pedal device 71, the damper 89 imparts damping action to the cam follower 85 to mitigate the vibration of the shift pedal device 71 and control lever 63. Further, the damper 89 applies an operating resistance to the shift pedal device 71 through the cam follower 85 and associated linkage elements, to prevent an abrupt operation of the shift pedal device 71.

With the above construction, when the forward speed control tread 72a of shift pedal device 71 is depressed from a neutral position, an operating force thereby produced is transmitted to the control lever 63 by the shifting mechanism 70. As a result, the control lever 63 swings forwardly of the vehicle body to switch the servo valve 62 to the forward position, which switches the main propelling change speed device 20 from neutral to a forward drive position. This causes the vehicle to travel forward. As the driver further depresses the forward speed control tread 72a, the control lever 63 swings to an increased extent forwardly of the vehicle body. The servo cylinder 61 enlarges the swash plate angle to shift the main propelling change speed device 20 to a higher speed position. As a result, the vehicle travels at an increased speed forward.

On the other hand, when the backward speed control tread 73a of shift pedal device 71 is depressed from a neutral position, an operating force thereby produced is transmitted to the control lever 63 by the shifting mechanism 70. As a result, the control lever 63 swings rearwardly of the vehicle body to switch the servo valve 62 to the backward drive position, which switches the main propelling change speed device 20 from neutral to a backward drive position. This causes the vehicle to travel backward. As the driver further depresses the backward speed control tread 73a, the control lever 63 swings to an increased extent rearwardly of the vehicle body. The servo cylinder 61 enlarges the swash plate angle to shift the main propelling change speed device 20 to a higher speed position. As a result, the vehicle travels at an increased speed backward.

When the driver releases the shift pedal device 71 depressed for forward or backward traveling, the neutral return mechanism 80 performs a neutral restoring action for automatically moving both the shift pedal device 71 and control lever 63 toward neutral, and shifting the main propelling change speed device 20 to the decelerating side. As a result, the traveling speed of the vehicle slows down. Finally, the shift pedal device 71 and control lever 63 return to neutral, and the main propelling change speed device 20 returns to neutral. As a result, the vehicle stops running.

At this time, the control lever 63 and shift pedal device 71 are steadily maintained in neutral by the damping action of damper 89 and the positioning action of neutral return mechanism 80.

Next, the cruising device 90 is constructed as follows.

A link rod 91 is connected to the bifurcated swing member 81 mounted on the shaft 76 extending through the propelling transmission case 6, in a position of the swing member 81 away from where the rod 82 is connected. A forward end of the link rod 91 has an ordinary rocking element (not shown), and a well-known retaining device 92 switchable between a frictionally holding position and a release position. The retaining device 92 and link rod 91 constitute the cruising device 90.

When the rocking element is rocked, the link rod 91 is pushed or pulled. By frictionally holding the link rod 91 in a selected position, the cruising device 90 maintains the position of the servo cylinder 61 linked to thereto.

[Other Embodiments]

(1) The arrangement of the hydraulic pump P and hydraulic motor M of the main propelling change speed device 20 is not limited to what is shown in the above embodiment. The hydraulic pump P and hydraulic motor M may be arranged at substantially the same level.

(2) The shift pedal device 71 is not limited to the construction having the pair of front and rear control pedals 72 and 73 as in the foregoing embodiment. The pedal device may have one control pedal with a front tread and a rear tread.

(3) The charge pressure setting main relief valve RM and charge relief valve RC may be removably mounted on the side wall of the change speed block portion 11.

What is claimed is:

1. A working vehicle comprising:
   an engine;
   a main clutch for connecting and disconnecting drive from said engine;
   a hydrostatic stepless transmission with a pump and a motor for changing speed of the drive transmitted from said main clutch;
   a front vehicle body supporting said engine;
   a rear vehicle body comprising a transmission case housing a propelling transmission for receiving speed-changed drive from said hydrostatic stepless transmission; and an intermediate vehicle body connected to said front vehicle body and said rear vehicle body to constitute a body of the working vehicle in combination with said front vehicle body and said rear vehicle body;

wherein said intermediate vehicle body comprises a case block housing said hydrostatic stepless transmission;

said case block includes, formed integral with one another, a small diameter portion connected to said rear vehicle body and providing case walls for said pump and said motor, a large diameter portion connected to said front vehicle body and having an upper edge at a higher level than an upper surface of said small diameter portion, and a transitional portion disposed between said small diameter portion and said large diameter portion;

said large diameter portion defines an accommodating space for said main clutch;

said transitional portion houses a shaft supporting wall portion for supporting a main clutch transmission shaft for outputting engine drive from said main clutch transmission shaft for outputting engine drive from said main clutch, and further supporting a pump rotary shaft provided for said pump as an input shaft of said hydrostatic stepless transmission for receiving said engine drive; and said shaft supporting wall portion includes:
- a first partition having bearings for supporting forward ends of said pump rotary shaft and a motor rotary shaft provided for said motor as an output shaft of said hydrostatic stepless transmission;
- a second partition having a bearing for supporting a rearward end of a first transmission gear mounted on an end of said pump rotary shaft extending through said first partition, and a bearing for supporting a rearward end of a second transmission gear formed on a rear end region of said main clutch transmission shaft; and
- a third partition having bearings for supporting forward regions of said first and second transmission gears, dividing an arranging space of said transmission gears from said accommodating space of said main clutch and having a lid member detachably attached to said second partition.

2. A working vehicle as defined in claim 1, wherein said transitional portion has an upper surface in form of an inclined wall so that the case block has a sectional profile gradually changing from said small diameter portion to said large diameter portion.

3. A working vehicle as defined in claim 2, wherein said small diameter portion, said large diameter portion and said transitional portion have respective lower surfaces at an equal level.

4. A working vehicle as defined in claim 1, wherein said arranging space of said first and second transmission gears communicates, for allowing a circulation of pressure oil, with a change speed chamber space formed in said small diameter portion for housing said pump and said motor of said main propelling change speed device.

5. A working vehicle as defined in claim 4, wherein said pump rotary shaft has an axis located below and offset to one side transversely of the vehicle body from an axis of said main clutch transmission shaft, and said motor rotary shaft has an axis located below and offset to the other side transversely of the vehicle body from said axis of said pump rotary shaft.

6. A working vehicle comprising:
an engine;
a main clutch for connecting and disconnecting drive from said engine;
a hydrostatic stepless transmission with a pump and a motor for changing speed of the drive transmitted from said main clutch;
a front vehicle body supporting said engine;
a rear vehicle body comprising a transmission case housing a propelling transmission for receiving speed-changed drive from said hydrostatic stepless transmission; and
an intermediate vehicle body connected to said front vehicle body and said rear vehicle body to constitute a body of the working vehicle in combination with said front vehicle body and said rear vehicle body;
said intermediate vehicle body comprises a case block housing said hydrostatic stepless transmission;
said case block includes, formed integral with one another, a small diameter portion connected to said rear vehicle body and providing case walls for said pump and said motor, a large diameter portion connected to said front vehicle body and having an upper edge at a higher level than an upper surface of said small diameter portion, and a transitional portion disposed between said small diameter portion and said large diameter portion; and
said large diameter portion defines an accommodating space for said main clutch; and
said transitional portion houses a shaft supporting wall portion for supporting a main clutch transmission shaft for outputting engine drive from said main clutch, and further supporting a pump rotary shaft provided for said pump as an input shaft of said hydrostatic stepless transmission for receiving said engine drive.

7. A working vehicle as defined in claim 6, wherein said transitional portion houses said shaft supporting wall portion substantially centrally thereof in a fore and aft direction of the vehicle.

8. A working vehicle as defined in claim 7, wherein said transitional portion has an upper surface in form of an inclined wall so that the case block has a sectional profile gradually changing from said small diameter portion to said large diameter portion, and wherein said shaft supporting wall portion extends down from said inclined wall.

9. A working vehicle as defined in claim 6, wherein said small diameter portion, said large diameter portion and said transitional portion have respective lower surfaces at an equal level.

* * * * *

UNITED STATES PATENT AND TRADEMARK OFFICE
CERTIFICATE OF CORRECTION

PATENT NO.    : 6,722,464 B2
DATED         : April 30, 2004
INVENTOR(S)   : Nakatani et al.

It is certified that error appears in the above-identified patent and that said Letters Patent is hereby corrected as shown below:

Title page,
Item [75], Inventors, after fourth inventor, "Ssakai" should read -- Sakai --.

Signed and Sealed this

Seventeenth Day of August, 2004

JON W. DUDAS
*Acting Director of the United States Patent and Trademark Office*